S. J. FONS.
WINCH FOR MOTOR VEHICLES.
APPLICATION FILED MAY 18, 1917.

1,318,139.

Patented Oct. 7, 1919.

Witness
Chas. W. Stauffiger
Karl H. Butler

Inventor
Stanley J. Fons,
By
Attorneys

UNITED STATES PATENT OFFICE.

STANLEY J. FONS, OF ROYAL OAK, MICHIGAN.

WINCH FOR MOTOR-VEHICLES.

1,318,139. Specification of Letters Patent. Patented Oct. 7, 1919.

Application filed May 18, 1917. Serial No. 169,406.

*To all whom it may concern:*

Be it known that I, STANLEY J. FONS, a citizen of the United States of America, residing at Royal Oak, in the county of Oakland and State of Michigan, have invented certain new and useful Improvements in Winches for Motor-Vehicles, of which the following is a specification, reference being had therein to the accompanying drawings.

This invention relates to winches for motor trucks or other vehicles, and my invention aims to provide a simple, durable and inexpensive winch that may be easily and quickly installed as part of a truck or vehicle frame, to be operated at will, by the engine or power plant of the motor vehicle. The winch is primarily intended for extricating a motor vehicle, or other vehicles in proximity thereto, from difficult positions, for instance ruts or ditches where the wheels of the motor vehicle cannot obtain a purchase or surmount the obstacle. Of course a cable or rope is used in connection with the winch and my invention also includes a novel detachable sheave block that may be placed at either side of a motor vehicle, so that the cable or rope can be extended in a desired direction relative to the motor vehicle.

My invention will be hereinafter specifically described and then claimed, and reference will now be had to the drawing, wherein—

Figures 1, 2, 3:
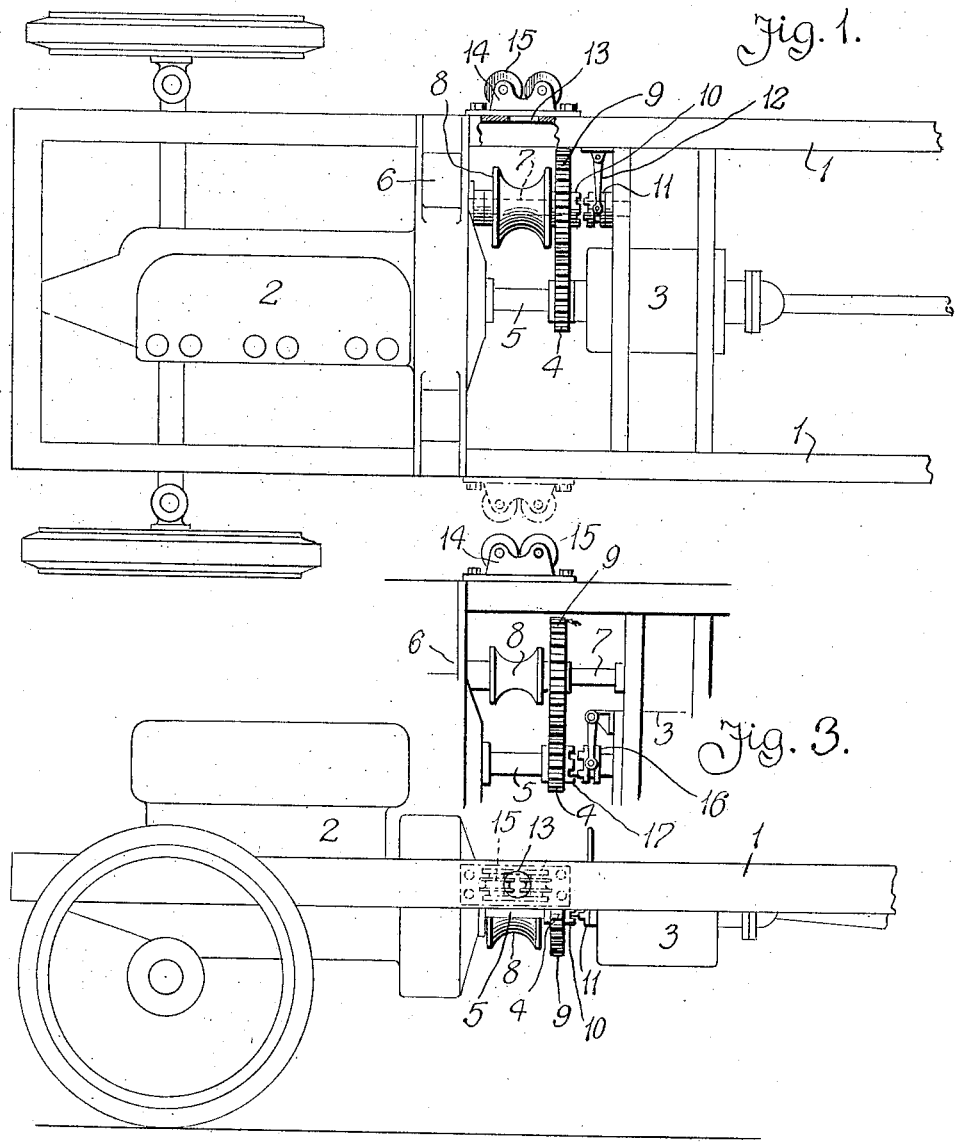
Figure 1 is a plan of a conventional form of motor vehicle frame provided with a winch and sheave block in accordance with my invention.
Fig. 2 is a side elevation of the same.
Fig. 3 is a plan of a clutch control for the winch.

In the drawing, 1 denotes a channel side frame of a motor vehicle having a power-plant, as an internal combustion engine 2, and between the engine and the usual change speed gear transmission mechanism 3, there is a small gear wheel 4 on the engine shaft 5.

Transverse frames 6 of the motor vehicle are provided with suitable bearings for a winch shaft 7 and on said shaft is a fixed winch 8, a large loose gear wheel 9 and a clutch member 10, the former meshing with the small gear wheel 4 and coöperating therewith in providing a reduction gearing so that the winch 8 may be safely operated at a reduced speed relative to the engine shaft 5.

Slidable on the winch shaft 7 and adapted for rotation therewith is a shiftable clutch member 11 adapted to establish rotative continuity between the loose gear wheel 9 and the winch 8. The clutch member 11 is adapted to engage the clutch member 10 and the clutch member 11 may be shifted through the medium of suitable levers, generally designated 12.

The side frames 1 of the motor vehicle are provided with openings 13 and connected to the outer sides of said frames are detachable sheave blocks 14 having revoluble sheaves 15 providing a guideway into each of the openings 13 for a cable or rope (not shown). One of the sheave blocks 14 has been shown in dotted lines, as it may be preferable to simply use one sheave block in connection with a motor vehicle and mount it at that side of the motor frame which can be conveniently used during the operation of the winch.

It is apparent that the cable or rope may have one end thereof attached to a tree or otherwise suitably anchored and the cable or rope trained about the winch so that the power thereof may be utilized for removing the motor vehicle from a difficult position, or with the motor vehicle suitably blocked, the same power may be employed for extricating other vehicles from difficult positions.

As shown in Fig. 1, the reduction gear would be constantly driven by the engine, and to obviate this, the gear 9 may be fixed to the winch 8, as shown in Fig. 3, and the gear 4 loose on the engine shaft 5. A clutch member 16 may be placed on the engine shaft 5, so that when shifted into the clutch member 17 of the gear 4, said gear will be driven by the engine shaft.

Two embodiments of my invention have been illustrated, but it is to be understood that the structural elements are susceptible to such variations and modifications as fall within the scope of the appended claim.

What I claim is:—

The combination with a motor vehicle having side frames provided with openings, transverse frames, and an engine shaft, of a longitudinally disposed winch shaft supported by said transverse frames between one of said frames and said engine shaft, a winch on said winch shaft adapted to have a cable trained thereabout, sheaves adapted for attachment to the outer side wall of either frame of said vehicle at the opening thereof and adapted to have the cable extend therebetween, gearing for said engine and winch shafts so that said engine shaft may operate said winch shaft, and a clutch on said engine shaft adapted for controlling the operation of said winch shaft by said engine shaft.

In testimony whereof I affix my signature in the presence of two witnesses.

STANLEY J. FONS.

Witnesses:
KARL H. BUTLER,
ANNA M. DORR.

Copies of this patent may be obtained for five cents each, by addressing the "Commissioner of Patents, Washington, D. C."